(12) United States Patent
Furuichi

(10) Patent No.: US 10,681,748 B2
(45) Date of Patent: Jun. 9, 2020

(54) COMMUNICATION METHOD AND COMMUNICATION APPARATUS

(71) Applicant: CANON KABUSHIKI KAISHA, Tokyo (JP)

(72) Inventor: Kaede Furuichi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 16/017,645

(22) Filed: Jun. 25, 2018

(65) Prior Publication Data

US 2019/0007981 A1    Jan. 3, 2019

(30) Foreign Application Priority Data

Jun. 30, 2017   (JP) .................................. 2017-128955

(51) Int. Cl.

| H04W 76/10 | (2018.01) |
|---|---|
| H04W 12/06 | (2009.01) |
| H04W 4/80 | (2018.01) |
| H04L 29/06 | (2006.01) |
| H04W 12/00 | (2009.01) |
| G06F 21/35 | (2013.01) |
| H04W 28/18 | (2009.01) |
| H04N 1/00 | (2006.01) |
| H04W 76/11 | (2018.01) |

(52) U.S. Cl.
CPC ............ *H04W 76/10* (2018.02); *G06F 21/35* (2013.01); *H04L 63/08* (2013.01); *H04W 4/80* (2018.02); *H04W 12/003* (2019.01); *H04W 12/06* (2013.01); *H04N 1/00371* (2013.01); *H04N 1/00968* (2013.01); *H04N 2201/0084* (2013.01); *H04W 28/18* (2013.01); *H04W 76/11* (2018.02)

(58) Field of Classification Search
CPC ..... H04W 76/10; H04W 4/80; H04W 12/003; H04W 12/06; H04W 28/18; H04W 76/11; H04W 76/14; H04W 84/18; H04L 63/08; G06F 21/35; H04N 1/00968; H04N 2201/0084; H04N 1/00371
See application file for complete search history.

(56) References Cited

U.S. PATENT DOCUMENTS 7,455,229 B2 * 11/2008 Tanaka ............... H04N 1/00278
                                                                235/462.01
8,289,890 B2 * 10/2012 Murayama ............ H04W 76/11
                                                                370/310

(Continued)

FOREIGN PATENT DOCUMENTS

JP          2007-228419 A          9/2007

*Primary Examiner* — Brian T O Connor
(74) *Attorney, Agent, or Firm* — Canon U.S.A., Inc. IP Division

(57) ABSTRACT

A method for pairing apparatuses includes causing an information processing apparatus to send a predetermined request to a communication apparatus, causing the communication apparatus to display first authentication information for pairing upon receiving the predetermined request, causing the information processing apparatus to enable input of second authentication information for pairing, and causing, when the second authentication, information is input, the information processing apparatus and the communication apparatus to perform pairing based on the first authentication information and the second authentication information.

20 Claims, 7 Drawing Sheets

(56) References Cited

U.S. PATENT DOCUMENTS

| | | | |
|---|---|---|---|
| 8,553,253 B2* | 10/2013 | Murayama | H04L 67/36 |
| | | | 358/1.15 |
| 8,650,400 B2* | 2/2014 | Kitagawa | H04N 1/32117 |
| | | | 380/270 |
| 10,321,516 B2* | 6/2019 | Ohhira | H04W 88/06 |
| 2016/0029154 A1* | 1/2016 | Brown | H04N 1/00347 |
| | | | 455/41.2 |
| 2017/0245314 A1* | 8/2017 | Ohhira | H04W 76/14 |
| 2018/0069726 A1* | 3/2018 | Ohhira | H04L 12/46 |
| 2018/0070407 A1* | 3/2018 | Ohhira | H04W 84/12 |
| 2019/0174304 A1* | 6/2019 | Tunnell | H04W 12/003 |
| 2019/0230613 A1* | 7/2019 | Kim | H04W 8/005 |
| 2019/0394744 A1* | 12/2019 | Kim | H04W 60/00 |

* cited by examiner

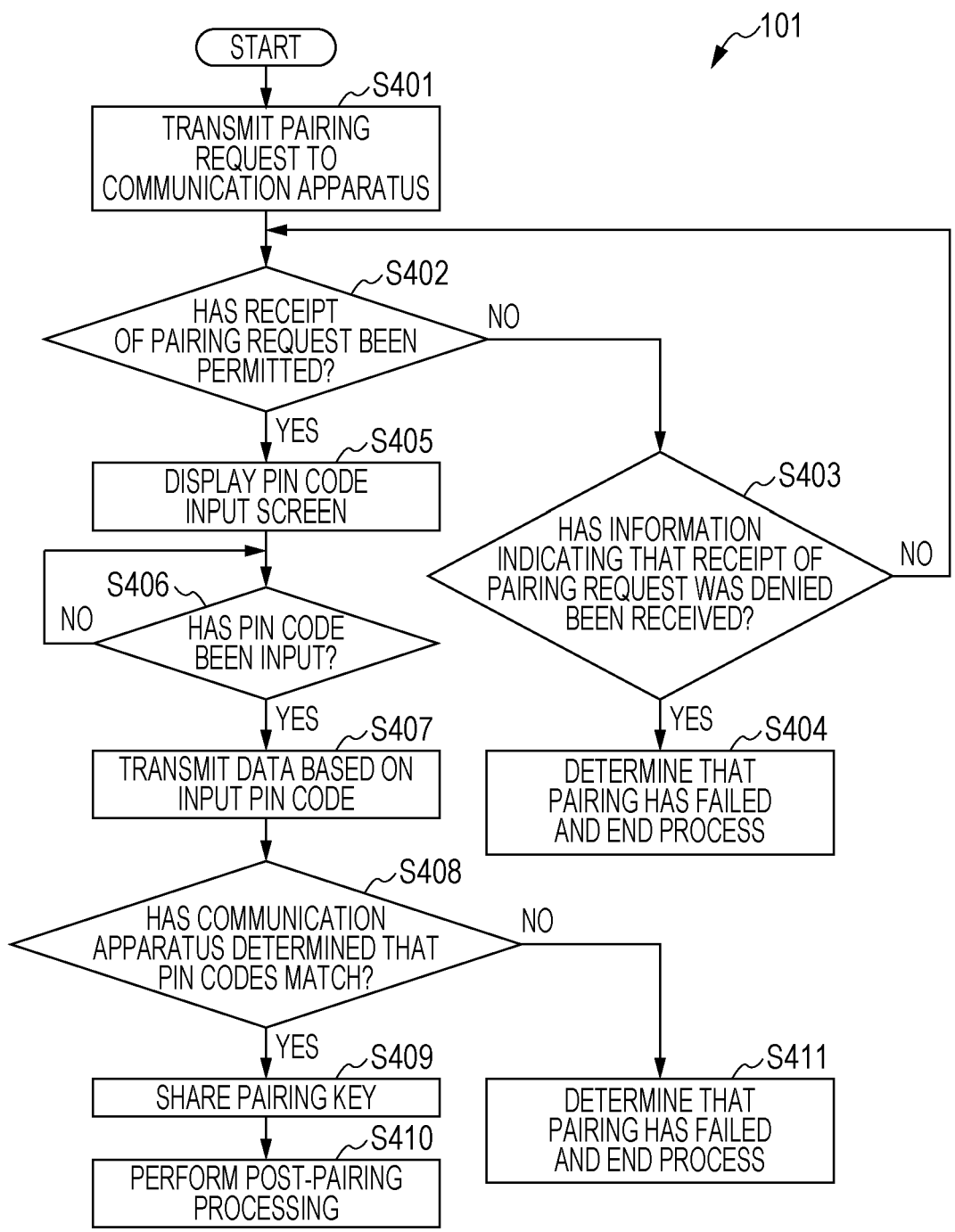

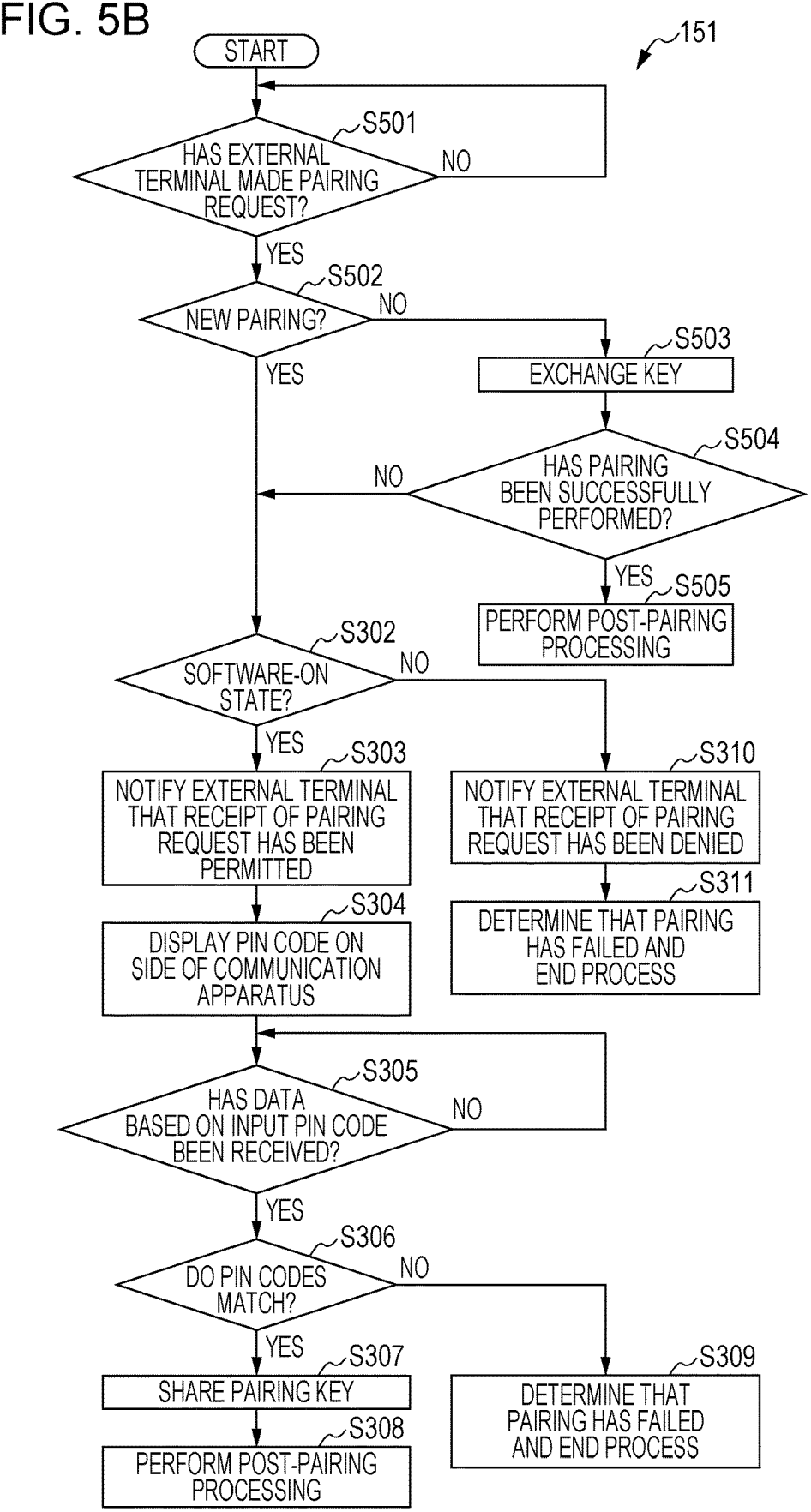

COMMUNICATION METHOD AND COMMUNICATION APPARATUS

BACKGROUND

Field

The present disclosure relates to a communication method of causing a communication apparatus and an information processing apparatus to perform pairing for predetermined wireless communication.

Description of the Related Art

There are cases where an information processing apparatus, such as a smartphone, and a communication apparatus, such as a printer, perform short-range wireless communication, such as Bluetooth® communication. For example, in a case where an information processing apparatus performs short-range wireless communication via Bluetooth®, the information, processing apparatus needs to perform pang processing with a communication partner to ensure security of communication and make the communication possible.

In the pang processing, an information processing apparatus and a communication apparatus need to exchange keys to be used for encryption and decryption with each other to establish one-to-one security. In order to protect the keys from disclosure to third parties, there are cases where, at the time of first pairing, security is established using a temporary key calculated from a PIN code and a random number and the exchange of keys is performed. For example, in a case where a pairing request is transmitted from the above-described information processing apparatus to the communication apparatus, a PIN code is displayed on the display screen of the communication apparatus and a user inputs the displayed PIN code into the information processing apparatus. In a case where the PIN code input into the information processing apparatus matches the PIN code displayed by the communication apparatus, a common temporary key is calculated. One-to one security between the information processing apparatus and the communication apparatus is established using the temporary key and the exchange of keys to be used for the following communication is performed. Japanese Patent. Laid-Open No. 2007-228419 discloses that a printer displays a PIN code.

However, when an information processing apparatus transmits a pairing request to a communication apparatus, the communication apparatus may be unable to display a PIN code. At that time, the information processing apparatus may request a user to input a PIN code despite the fact that a PIN code is not displayed on the communication apparatus.

SUMMARY

The present disclosure provides a technique for appropriately performing pairing based on the state of a communication apparatus.

A communication method according to an embodiment of the present disclosure is a method of causing a communication apparatus and an information processing apparatus to perform pairing for predetermined wireless communication. The communication method includes causing the information processing apparatus to make a predetermined request to the communication apparatus, causing the communication apparatus to display first authentication information for the pairing upon receiving the predetermined request, causing the information processing apparatus to display an input screen on which a user inputs second authentication information for the pairing, and causing, in a case where the second authentication information has been input on the input screen, the information processing apparatus and the communication apparatus to perform the pairing based on the first authentication information and the second authentication information. The information processing apparatus does not display the input screen in a case where the communication apparatus that has received the predetermined request is in a first state where the first authentication information is not displayed. The information processing apparatus displays the input screen in a case where the communication apparatus that received the predetermined request is in a second state where the first authentication information is displayed.

Further features will become apparent from the following description of exemplary embodiments with reference to the attached drawings.

BRIEF DESCRIPTION OF THE DRAWINGS

FIGS. 3A and 31 are flowcharts illustrating an exemplary pairing process according to an embodiment.

FIGS. 4A to 40 are diagrams illustrating exemplary display screens displayed by a display unit in a communication apparatus.

FIGS. 5A and 5B are flowcharts illustrating an exemplary pairing process according to an embodiment.

DESCRIPTION OF THE EMBODIMENTS

Figure 1:
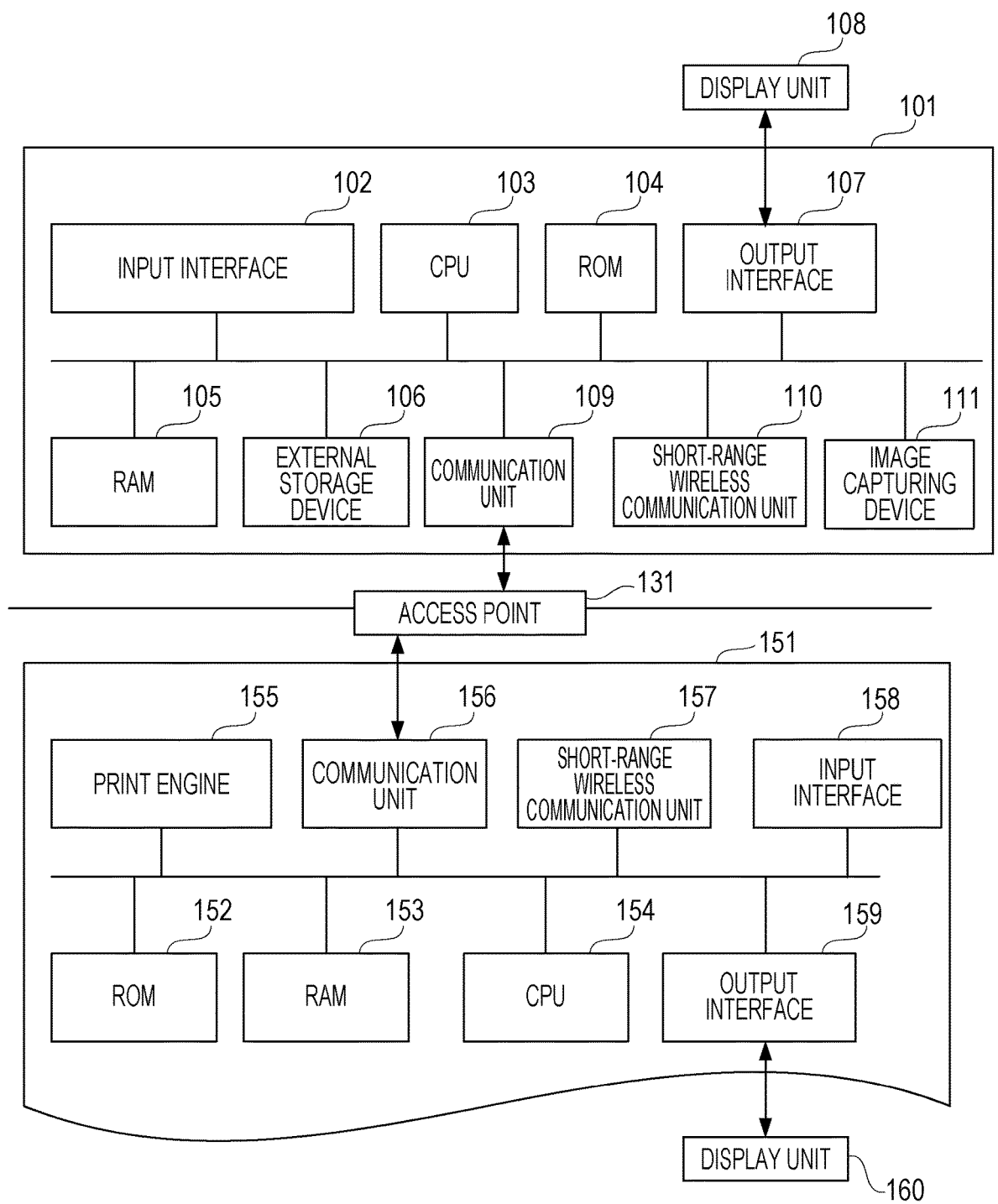
FIG. 1 is a diagram illustrating the configuration of a communication system according to an embodiment.

An exemplary embodiment will be described below by way of example with reference to the accompanying drawings. It should be noted that changes and modifications can be made to the following embodiment without departing from the scope of the present disclosure based on the knowledge of those skilled in the art and these changes and modifications are also intended to be within the scope of the aspects of the present disclosure.

An information processing apparatus and a communication apparatus included in a communication system according to this embodiment will be described. An information processing apparatus is a smartphone in this embodiment, but may be, for example, a mobile terminal, a notebook PC, a tablet terminal, a personal digital assistant (PDA), or a digital camera. A communication apparatus is a printer in this embodiment, but may be any apparatus capable of wirelessly communicating with, an information processing apparatus. Examples of a communication apparatus include various printers such as an ink-jet printer, a full-color laser beam printer, and a black-and-white printer, a copier, a facsimile apparatus, a mobile terminal, a smartphone, a notebook PC, a tablet terminal, a PDA, a digital camera, a music reproduction device, a television, and a multifunction device having a plurality of functions such as a copy function, a facsimile function, and a print function.

First, the configurations of an information processing apparatus according to this embodiment and a communication, apparatus capable of communicating with, an information processing apparatus according to this embodiment will be described with reference to a block diagram in FIG. 1.

Although the following exemplary configuration of an information processing apparatus is employed in this embodiment, an, information processing apparatus according to this embodiment does not necessarily have to have functions illustrated in the drawing as long as it can communicate with a communication apparatus.

FIG. 1 is a diagram illustrating the configuration of a communication system according to this embodiment. An information processing apparatus 101 illustrated in FIG. 1 includes an input interface 102, a central processing unit (CPU) 103, a read-only memory (ROM) 104, a random access memory (RAM) 105, an external storage device 106, an output interface 107, a display unit 108, a communication unit 109, a short-range wireless communication unit 110, and an image capturing device 111. It is assumed that the information processing apparatus 101 is a smartphone, but the information processing apparatus 101 is not limited to a smartphone.

The input interface 102 is an interface for receiving the input of data or an operation instruction from a user, and is formed of, for example, a physical keyboard, a button, and a touch panel. The output interface 107 to be described below and the input interface 102 may have the same configuration and the output of a screen and the receipt of an operation from a user may be performed using the same configuration.

The CPU 103 is system control unit and controls the whole of the information processing apparatus 101. The ROM 104 stores fixed data such as control programs to be executed by the CPU 103, a data table, and an embedded operating system (hereinafter referred to as "OS") program. In this embodiment, the respective control programs stored in the ROM 104 perform software execution controls such as scheduling, task switching, and interrupt processing under the control of the embedded OS stored in the ROM 104. The RAM 105 is formed of, for example, a static random access memory (SRAM) that requires a backup power supply. In the RAM 105, data is held by a primary battery for data backup (not illustrated). The RAM 105 therefore can store important data such as a program control variable without volatilizing the data. A memory area for storing setting information of the information processing apparatus 101 and management data of the information processing apparatus 101 is also provided in the RAM 105. The RAN 105 is also used as a main memory and a work memory for the CPU 103.

The external storage device 106 includes an application for providing print execution function (hereinafter referred to as a "print application"). The external storage device 106 includes various programs such as a print information generation program for generating print information that can be interpreted by a communication apparatus 151 and an information transmission/receipt control program for transmitting/receiving information to/from the communication apparatus 151 connected to the information processing apparatus 101 via the communication unit 109. The external storage device 106 saves various pieces of information to be used in these programs. The external storage device 106 also saves image data obtained from another information processing apparatus or the Internet via the communication unit 109.

The CPU 103 can control the respective constituents included in the information processing apparatus 101 by executing various programs stored in the ROM 104 and the external storage device 106 using the RAM 105 serving as a work memory. For example, the CPU 103 can realize various pieces of processing written in the above-described print application by executing the print application using an OS.

The output interface 107 is an interface for controlling the display unit 108 to display data or make a notification of the state of the information processing apparatus 101. The CPU 103 can cause the display unit 108 to perform various pieces of display processing by controlling the output interface 107. The display unit 108 includes, for example, a light-emitting diode (LED) and a liquid crystal display (LCD). The display unit 108 displays data or makes a notification of the state of the information processing apparatus 101. In a case where the display unit 108 is a touch panel, a software keyboard including keys such as a numerical value input key, a mode setting key, a determination key, a cancellation key, and a power key may be displayed on the display unit 108 and an input from a user may be received via the display unit 108.

The communication unit 109 is a constituent for connecting to an apparatus such as the communication apparatus 151 and performing data communication under the control of the CPU 103. For example, the communication unit 109 can connect to an access point 131 outside the information processing apparatus 101 and the communication apparatus 151 or an access point (not illustrated) in the communication apparatus 151. The communication unit 109 and the access point in the communication apparatus 151 connect to each other, so that the information processing apparatus 101 and the communication apparatus 151 can communicate with each other. The CPU 103 can connect the communication unit 109 to each of two access points, the access point 131 and, the access point in the communication apparatus 151, by performing common connection processing. The communication unit 109 may directly connect to the communication apparatus 151 via the access point in the information processing apparatus 101 or directly connect to the communication apparatus 151 through wireless communication by bypassing the access point. Examples of the wireless communication method include Wireless Fidelity (Wi-Fi®). Examples of the access point 131 include a device such as a wireless local area network (LAN) router. In this embodiment, a method in which the information processing apparatus 101 and the communication apparatus 151 directly connect to each other by bypassing an external access point such as the access point 131 is referred to as a "direct connection method", method in which the information processing apparatus 101 and, the communication, apparatus 151 connect to each other via an external access point such as the access point 131 is referred to as an "infrastructure connection method".

The short-range wireless communication unit 110 is a constituent for establishing short-range wireless connection to an apparatus such as the communication, apparatus 151 and performing data, communication. The short-range wireless communication unit 110 performs communication using a communication method different from that of the communication unit 109. The short-range wireless communication unit 110 can connect to a short-range wireless communication unit 157 in the communication apparatus 151. In this embodiment, as the communication method of the short-range wireless communication unit 110, Bluetooth® Low Energy is used. In this case, the communication unit 109 may perform communication using the previous Bluetooth® communication method instead of Bluetooth® Low Energy.

The image capturing device 111 is a device for converting an image captured by an image sensor into digital data. The digital data is stored in the RAM 105. The digital data is then converted into a predetermined image format by a program executed by the CPU 103, and the resulting data is saved in the external storage device 106 as image data.

The communication apparatus 151 is a communication apparatus according to this embodiment. The communication apparatus 151 includes a ROM 152, a RAM 153, a CPU 154, a print engine 155, a communication unit 156, the short-range wireless communication unit 157, an input interface 158, an output interface 159, and a display unit 160. It is assumed that the communication apparatus 151 is a device such as an MFP, but the communication apparatus 151 is not limited to an MFP.

The communication unit 156 includes, as the access point in the communication apparatus 151, an access point for connecting to an apparatus such as the information processing apparatus 101. The communication unit 156 may include a piece of hardware functioning as an access point or may operate as an access point using software for causing the communication unit 156 to function as an access point. The communication unit 109 in the information processing apparatus 101 can connect to this access point. The communication unit 156 may directly communicate with the information processing apparatus 101 through wireless communication, or may communicate with the information processing apparatus 101 via the external access point 131. Examples of the communication method include tai-Fi® and Bluetooth®.

The RAM 153 formed of a dynamic random access memory (DRAM) that requires a backup power supply. In the RAM 153, data is held using a power supply for data backup (not illustrated). The RAM 153 can therefore store important data such as a program control variable without volatilizing the data. The RAM 153 is also used as a main memory and a work memory for the CPU 154, and saves a receive buffer for temporarily saving print information received from, for example, the information processing apparatus 101 and various pieces of information. The ROM 152 stores fixed data such as control programs to be executed by the CPU 154, a data table, and an OS program. In this embodiment, the respective control programs stored in the ROM 152 include program modules for performing software execution controls such as scheduling, task switching, and interrupt processing under the control of an embedded OS stored in the ROM 152. In the ROM 152, a memory area for storing data that needs to be held even in a case where power is not supplied, such as setting information of the communication apparatus 151 and management data of the communication apparatus 151, is also provided.

The CPU 154 is a system control unit, and controls the whole of the communication apparatus 151 by executing various programs stored in the ROM 152 using the RAM 153 serving as a work memory.

The print engine 155 includes a mechanism for conveying a print medium (print sheet or the like) and a mechanism, for applying a recording agent such as ink or toner to a print medium. In a case where ink is applied to a print medium, the print engine 155 includes a carriage to which a recording head for discharging ink can be attached and a mechanism for causing the carriage to scan a print medium. The CPU 154 controls the print engine 155 based on information saved in the RAM 153 and a print job received from, for example, the information processing apparatus 101 to form an image on a print medium such as a sheet using a recording agent such as ink and output a printing result. At that time, since a print job transmitted, from, for example, the information processing apparatus 101 includes image data, the amount of transmission data is large and high-speed communication is needed. In this embodiment, a print job is therefore received through communication (for example, a wireless LAN) performed ty the communication unit 156 whose speed is higher than that of communication. (for example, Bluetooth® Low Energy communication) performed by the short-range wireless communication unit 157.

The input interface 158 is an interface for receiving the input of data or an operation instruction from a user and includes, for example, a physical keyboard, a button such as a power button, and a touch panel. The output, interface 159 to be described below and the input interface 158 may have the same configuration and the output of a screen and the receipt of an operation from a user may be performed using the same configuration. The output interface 159 is an interface for controlling the display unit 160 to display data or make a notification of the state of the communication apparatus 151.

The display unit 160 includes, for example, a light-emitting diode (LED) and a liquid crystal display (LCD). The display unit 160 displays information about pairing (for example, a PIN code) and, data and makes a notification of the state of the communication apparatus 151. In a case where the display unit 160 is a touch panel, a software keyboard including keys such as a numerical value input key, a mode setting key, a determination key, a cancellation key, and a power key may be displayed on the display unit 160 and an input from a user may be received via the display unit 160.

Figure 2:
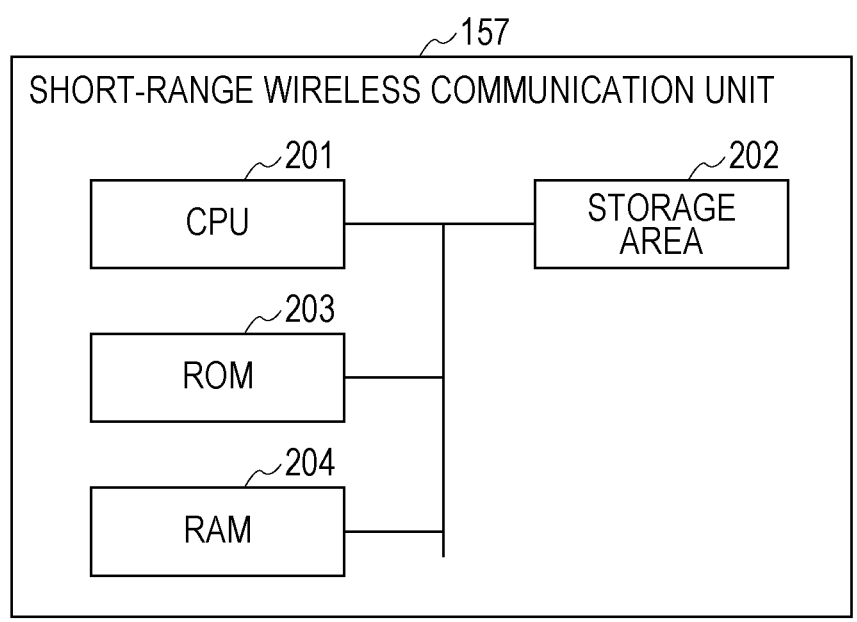
FIG. 2 is a block diagram illustrating the configuration of a short-range wireless communication unit according to an embodiment.

FIG. 2 is a block, diagram illustrating the configuration of the short-range wireless communication unit 157 according to this embodiment. The short-range wireless communication unit 157 is a constituent for establishing short-range wireless connection to an apparatus such as the information processing apparatus 101. In this embodiment, as the communication method of the short-range wireless communication, unit 157, Bluetooth® Low Energy is used. The short-range wireless communication, unit 157 and the CPU 154 communicate with each other via a bus interface such as an Inter-Integrated Circuit (I2C). The short-range wireless communication unit 157 includes a CPU 201, a storage area 202, a ROM 203, and a RAN 204. The storage area 202 is accessible by the CPU 154, and is also accessible by the information processing apparatus 101 via the short-range wireless communication unit 110. The RAN 204 is formed, of, for example, a DRAM that requires a backup power supply. In the RAM 204, data is held using a power supply for data backup (not illustrated). The RAM 204 can therefore store important data such as a program control variable without volatilizing the data. The RAM 204 is also used as a main memory and a work memory for the CPU 201. The ROM 203 stores fixed data such as control programs to be executed by the CPU 201, a data table, and an OS program. The CPU 201 controls the whole of the short-range wireless communication unit 110 by executing various programs stored in the ROM 203 using the RAM 204. The short-range wireless communication unit 110 included in the information processing apparatus 101 may also have the configuration, illustrated in FIG. 2.

To the communication apparatus 151, a memory such as an external hard disk drive (HDD) or a Secure Digital (SD) card may be attached as an optional device. Information saved in the communication apparatus 151 may be saved in this memory. The allocation of processing between the information, processing apparatus 101 and the communication apparatus 151 has been, described above by way of example, but is not limited to this allocation form. Another allocation form may be employed.

The communication apparatus 151 according to this embodiment causes the short-range wireless communication unit 157 to perform Bluetooth® Low Energy pairing with an external apparatus such as the information processing apparatus 101. In a case where the pairing has had a success, the short-range wireless communication unit 157 performs GATT communication, which is standardized by Bluetooth® Low Energy, with the external apparatus as predetermined communication. Even before the success of the pairing, the short-range wireless communication unit 157 and the information processing apparatus 101 can perform a part of communication standardized by Bluetooth® Low Energy.

Pairing processing according to this embodiment will be described below. In this embodiment, pairing is performed using Passkey Entry that is a pairing authentication method in which a user inputs a PIN code. In Passkey Entry that is a pairing authentication method, a passkey called a PIN code is input as authentication information for confirmation. A pairing authentication method may be a method in which authentication code matching confirmation is performed using Numeric Comparison, and another type of authentication information may be used.

The communication apparatus 151 according to this embodiment displays a PIN code on the display unit 160 in response to a pairing request transmitted from the information processing apparatus 101. At that time, the communication apparatus 151 may be in a software-off state in which a power supply is turned off by the pressing of, for example, a power key included in the input interface 158. The states of the communication apparatus 151 include a hardware-off state, the software-off state, and a software-on, state. The hardware-off state is a state in which an AC power supply cable (not illustrated) included in the communication apparatus 151 is not connected to an AC power supply. In a case where the communication apparatus 151 does not include a battery, power is not supplied to the communication apparatus 151 in this state. The software-on state is a state in which the pressing of a power key by a user during the connection of an AC power supply cable to an AC power supply supplies power each, unit in the communication apparatus 151 and various pieces of processing such as printing are executable. The software-off state is a state in which an AC power supply cable is connected to an AC power supply but the power consumption of this state is smaller than that of the software-on state. Specifically, in the software-off state, the display unit 160 does not perform, display. In addition, power is not supplied to a part of constituents (for example, the print engine 155) and, the operating clock frequency of the CPU 154 is also lower than that of the software-on state. A user can set in the software-on state whether the communication unit 156 and the short-range wireless communication unit 157 are activated, in the software-off state. Accordingly, there is a case where, in the software-off state the communication apparatus 151, the display unit 160 cannot perform, display but the short-range wireless communication, unit 157 can perform communication.

In the software-off state, the communication apparatus 151 cannot display a PIN code even if it has been able to receive a pairing request from the information processing apparatus 101 via the short-range wireless communication unit 157. Accordingly, even if a PIN code input screen is displayed in the information processing apparatus 101, a user cannot recognize a PIN code to be input. In this embodiment, in a case where the communication apparatus 151 has received a pairing request, it is therefore determined whether the state of the communication apparatus 151 is a predetermined state in which a PIN code is displayable. In a case where the communication apparatus 151 is not, in the predetermined state, the receipt of the pairing request is denied. This prevents the case where the PIN code input screen is displayed in the information processing apparatus 101 even though a PIN code is not displayed in the communication apparatus 151. This will be described in detail below with reference to FIGS. 3A and 3B.

Figure 3B:
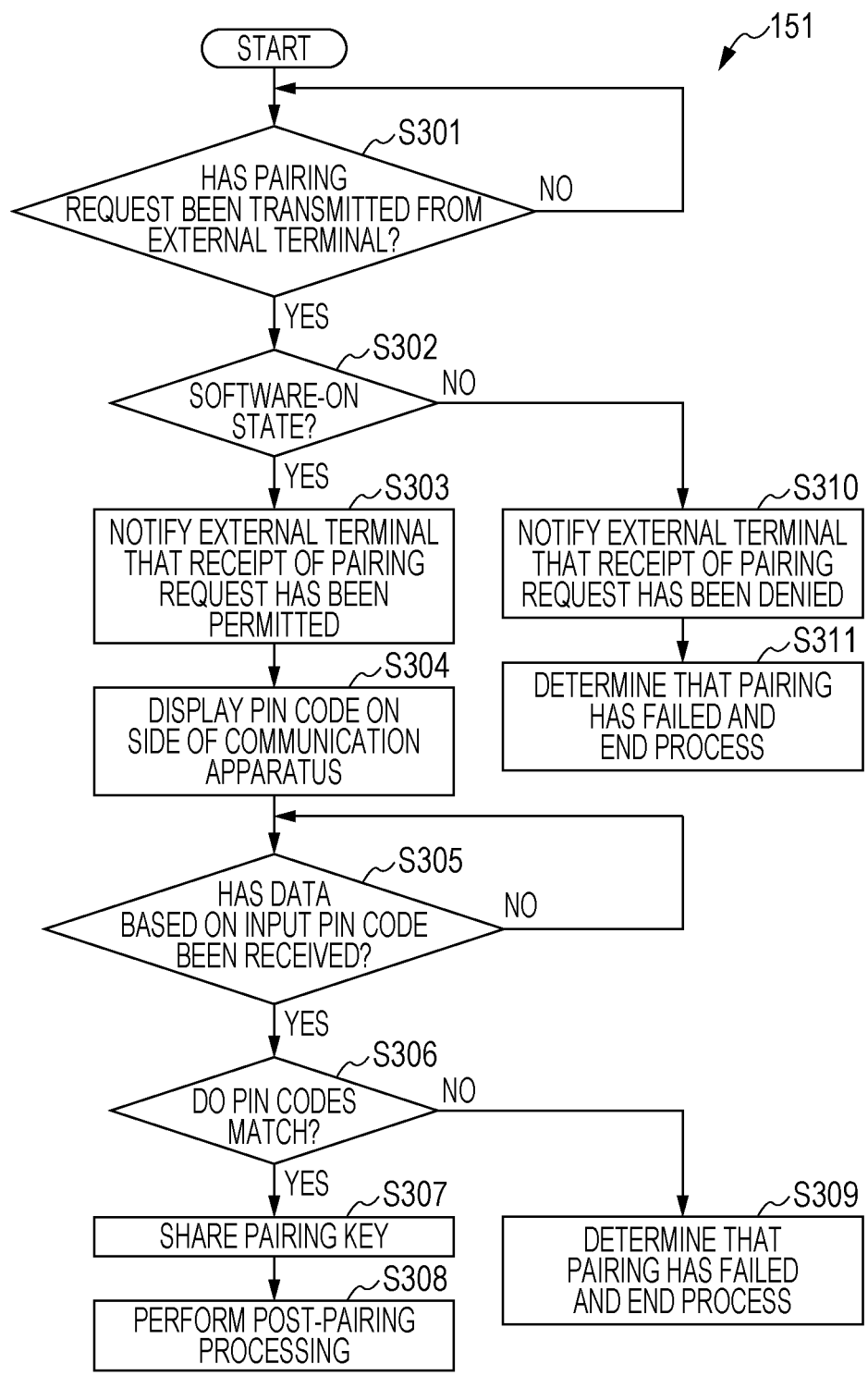

FIGS. 3A and 3B are flowcharts illustrating an exemplary pairing process at the time of new pairing. Specifically, there is illustrated a paring process performed by the communication apparatus 151 and the information processing apparatus 101 via the short-range wireless communication units 110 and 157. The information processing apparatus 101 performs a process illustrated in FIG. 3A, and the communication apparatus 151 performs a process illustrated in FIG. 3B. Specifically, the process illustrated in FIG. 3B, which is performed by the communication apparatus 151, is realized by causing the CPU 154 to execute various programs stored, in the ROM 152 in the RAM 153. The process illustrated in FIG. 3A, which is performed by the information processing apparatus 101, is realized by causing the CPU 103 to execute various programs stored in the ROM 104 in the RAM 105. The process performed by the communication apparatus 151 may be realized by causing the CPU 201 included in the short-range wireless communication unit 157 to execute various programs stored in the ROM 203 in the RAM 204. Alternatively, the process illustrated in FIGS. 3A and 3B may be realized by causing the CPUs 103 and 201 to cooperate with each other. Various types of communication between the information processing apparatus 101 and the communication apparatus 151 illustrated in FIGS. 3A and 3B are performed by the short-range wireless communication units 110 and 157.

The information processing apparatus 101 performs Bluetooth® Low Energy connection when a user has input an instruction, for performing Bluetooth® Low Energy communication, and the information processing apparatus 101 has received an advertisement signal from the communication apparatus 151. Subsequently, in a case where an access to data requiring authentication is instructed, the process illustrated in FIG. 3A starts. The communication apparatus 151 performs Bluetooth® Low Energy connection while or after transmitting an advertisement signal and starts the process illustrated in FIG. 3B.

In S401, the information processing apparatus 101 transmits a pairing request to the communication, apparatus 151 to perform GATT communication in Bluetooth® Low Energy.

In S301, the communication apparatus 151 determines whether a pairing request, has been received from an external terminal. In a case where a pairing request has been transmitted from the information processing apparatus 101 in S401, it is determined in S301 that a pairing request has been received.

In S302, the communication apparatus 151 determines whether the communication apparatus 151 is in the software-on state. In a case where it is determined that the communication apparatus 151 is in the software-on state, the processing of S303 is performed. In a case where it is determined that the communication apparatus 151 is not in the software-on state, the processing of S310 is performed. In this embodiment, the communication apparatus 151 can display a PIN code on the display unit 160 in the software-on state and cannot display a PIN code in the software-off state.

The processing of S302 can therefore make it possible to determine whether communication apparatus 151 can display a PIN code.

Various states may be set for the communication apparatus 151 as PIN code displayable states and PIN code undisplayable states, and various determination conditions corresponding to PIN code displayable states (undisplayable states) may also be set in S302. That is, various pieces of determination processing for determining whether the communication apparatus 151 can display information about pairing can be applied.

Figure 4A:
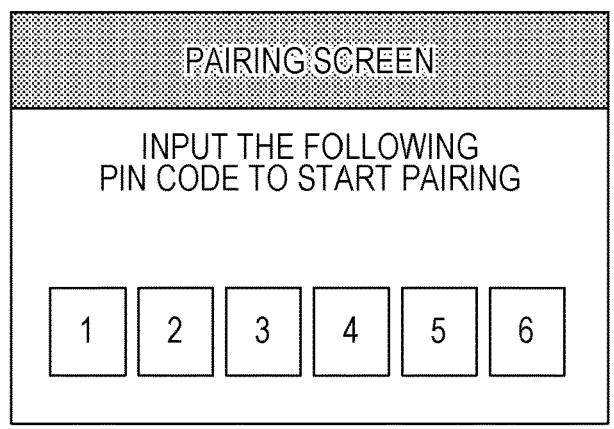

First, the case where the communication apparatus 151 is in the software-on state at the time of the determination, processing of S302 will be described. In S303, the communication apparatus 151 notifies the external terminal via the short-range wireless communication, unit 157 that the communication apparatus 151 has received the pang request. That is, the communication apparatus 151 notifies the short-range wireless communication unit 110 that the receipt of the pairing request has been, permitted. In S304, the communication apparatus 151 displays a PIN code on the display unit 160. FIGS. 4A to 4O are diagrams illustrating exemplary display screens displayed by the display unit 160 in the communication apparatus 151. In S304, a PIN code screen illustrated in FIG. 4A is displayed.

Figure 4B:
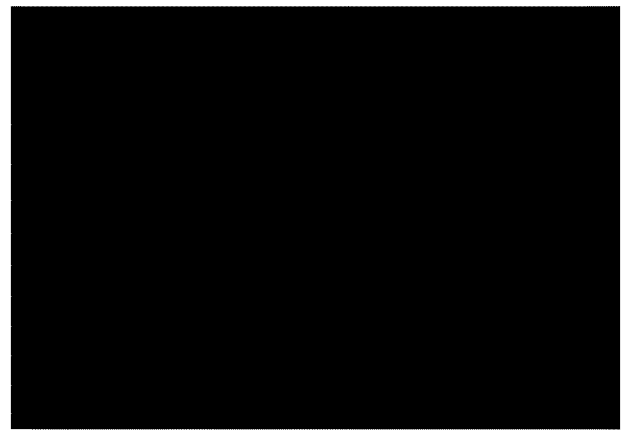
Figure 4C:
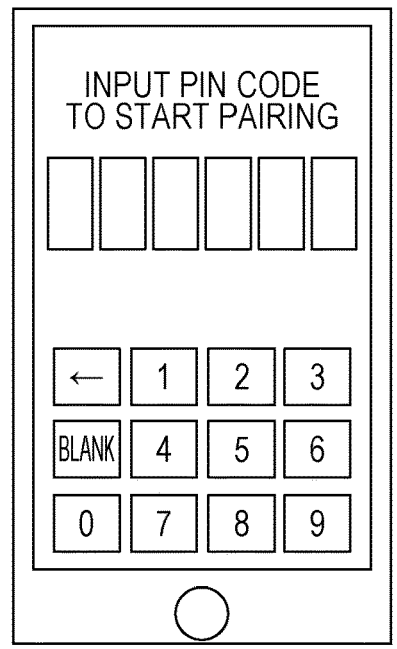

In S402, the Information processing apparatus 101 determines whether the receipt of the pairing request has been permitted, in a case where the communication apparatus 151 has provided a notification in S303, the information Processing apparatus 101 determines that the receipt of the pairing request has been permitted in S402 and performs the processing of S405. In S405, the information processing apparatus 101 displays a PIN code input screen illustrated in FIG. 4C on the display unit 108. In S406, the information processing apparatus 101 determines whether a user has input a PIN code using the input interface 102 on the input screen illustrated in FIG. 4C. In a case where it is determined in S406 that a PIN code has been input, the information processing apparatus 101 transmits predetermined data based on the input PIN code to the communication apparatus 151 in S407. For example, the information processing apparatus 101 transmits a random number N to the communication apparatus 151. The communication apparatus 151 transmits a random number S to the information Processing apparatus 101. The information processing apparatus 101 calculates a temporary key based on the random number M, the random number S received from the communication apparatus 151, and the PIN code input from the user, encrypts data using the temporary key, and transmits the data to the communication apparatus 151 as the above-described predetermined data.

In S305, the communication apparatus 151 determines whether the above-described predetermined data has been received. In a case where the predetermined data has been received, the communication apparatus 151 determines in S306 whether the PIN code input into the information processing apparatus 101 by the user matches the PIN code displayed in S304. Specifically, the communication apparatus 151 decrypts the received predetermined data using the temporary key calculated based on the random number M received from the information processing apparatus 101, the random number S transmitted to the information processing apparatus 101, and the PIN code displayed in S304.

In a case where decryption has been successfully performed, the communication apparatus 151 determines in S306 that the PIN code input into the information processing apparatus 101 by the user in S406 and the PIN code displayed in S304 match.

In S408, the information processing apparatus 101 determines whether the communication apparatus 151 has determined that the PIN code input by the user matches the PIN code displayed on the communication apparatus 151. Specifically, like the processing of S407 performed by the information processing apparatus 101, the communication apparatus 151 encrypts data using the temporary key calculated from the random number M, the random number S, the PIN code displayed, in S304 and transmits the data, to the information processing apparatus 101 as predetermined data in S305. The information processing apparatus 101 decrypts the predetermined data using the temporary key calculated from the random number N, the random number S, and the PIN code input by the user. In a case where the decryption has been successfully performed, the information processing apparatus 101 determines in S408 that the PIN code input by the user matches the PIN code displayed on the communication apparatus 151.

In a case where it has been determined in S408 that the PIN codes match, the processing of S109 is performed, by the information processing apparatus 101 and the processing of S307 is performed by the communication apparatus 151. The processing of S409 and S307 is storage control processing for sharing a key for GATT communication Bluetooth® Low Energy between the information processing apparatus 101 and the communication apparatus 151 and storing the key in, the information processing apparatus 101 and the communication apparatus 151. Specifically, the same key and information for key recognition are shared between the information processing apparatus 101 and the communication apparatus 151 via the short-range wireless communication, units 110 and 157 and are saved (stored) in the ROMs 104 and 152. The information for key recognition is used for the retrieval of the saved key. When pairing between the information processing apparatus 101 and the communication apparatus 151 is performed again, pairing authentication is performed by confirming whether the keys saved in the ROMs 104 and 152 match. In the case of the paring of the same combination of the information processing apparatus 101 and the communication, apparatus 151, the keys match and paring between them is successfully performed.

The processing of S408 and the processing of S409 do not necessarily have to be different from each other. For example, the data encrypted and transmitted by the communication apparatus 151 in S305 may be set as a pairing key. The determination of whether PIN codes match based on a result of decryption and the processing for sharing a pang key may be performed at the same time.

After the sharing of a pairing key has been performed in S409 and S307, the information processing apparatus 101 and the communication apparatus 151 determine that pairing has been successfully performed, and perform post-pairing processing in S410 and S308, respectively. For example, GATT communication in Bluetooth® Low Energy is performed. The detailed description of post-pairing GATT communication will be omitted.

In a case where it is not determined in S408 that, the PIN codes match, the information processing apparatus 101 determines in S411 that pairing has failed and ends the process illustrated in FIG. 3A. At that time, a message of, for example, "pairing has failed" may be displayed on the display unit 108. In a case where the communication apparatus 151 does not determine that the PIN codes match even after a predetermined period of time has elapsed from the processing of S407, the process may proceed from S408 to S411. In a case where it has not been determined in S306 that the PIN codes match, the communication apparatus 151 determines that the pairing has failed and ends the process illustrated in FIG. 33. At that time, a message of, for example, "pairing has failed" may be displayed on the display unit 160.

Next, the case where the communication apparatus 151 is in the software-off state at the time of the processing of S302 will be described.

In a case where the communication apparatus 151 is in the software-off state, the display unit 160 does not perform display as illustrated in FIG. 43. That is, since the communication apparatus 151 in the software-off state cannot display a PIN code, the receipt of the pairing request is denied in S310. Specifically, in S310, the communication apparatus 151 transmits information indicating that the receipt of the pairing request is denied, which is different from information transmitted in S303, to the information processing apparatus 101. In S311, the communication apparatus 151 determines that the pairing has failed and ends the process illustrated in FIG. 3B. At that time, the Bluetooth® low Energy connection may be disconnected, and a message of, for example, "pairing has failed" may be displayed on the display unit 160.

In S403, the information processing apparatus 101 determines whether it has received the information indicating that the receipt of the pairing request is denied which has been transmitted from the communication apparatus 151 in 3310. In a case where it is determined in S403 that the information has been received, the information processing apparatus 101 determines in S404 that the pairing has failed and ends the process illustrated in FIG. 3A. At that time, the Bluetooth® Low Energy connection may be disconnected, and a message of, for example, "pairing has failed" may be displayed on the display unit 108. After the process has ended in S403 or S411, the process illustrated in FIG. 3A may be performed again when a user makes a pairing instruction again in the information processing apparatus 101.

In the process illustrated in FIGS. 3A and 3B, it a case where the communication apparatus 151 is in a predetermined state in which a PIN code is not displayed, the communication apparatus 151 denies the receipt of pairing request transmitted from the information processing apparatus 101. As a result, a PIN code input screen is not displayed in the information processing apparatus 101. Thus, the case where an input screen requesting a user to input a PIN code is displayed in the information processing apparatus 101 despise the fact that the PIN code is not splayed in the communication apparatus 151 can be prevented.

In a case where it is determined in S302 that the communication apparatus 151 is in the software-off state and the communication apparatus 151 makes a notification that the receipt of the pairing request has been denied in S310, the information processing apparatus 101 may cause the display unit 108 to display information indicating that the communication apparatus 151 is not in the software-on state.

As described above, when pairing between the information processing apparatus 101 and the communication apparatus 151 is performed again, pairing authentication is performed by confirming whether the keys saved in the ROM's 104 and 152 match. In the case of the paring of the same combination of the information processing apparatus 101 and the communication apparatus 151, the keys match and paring between them is successfully performed. Accordingly, in a case where a common key has already been saved in the information processing apparatus 101 and the communication apparatus 151, the PIN code input screen does not necessarily have to be displayed in S405.

Figure 5A:
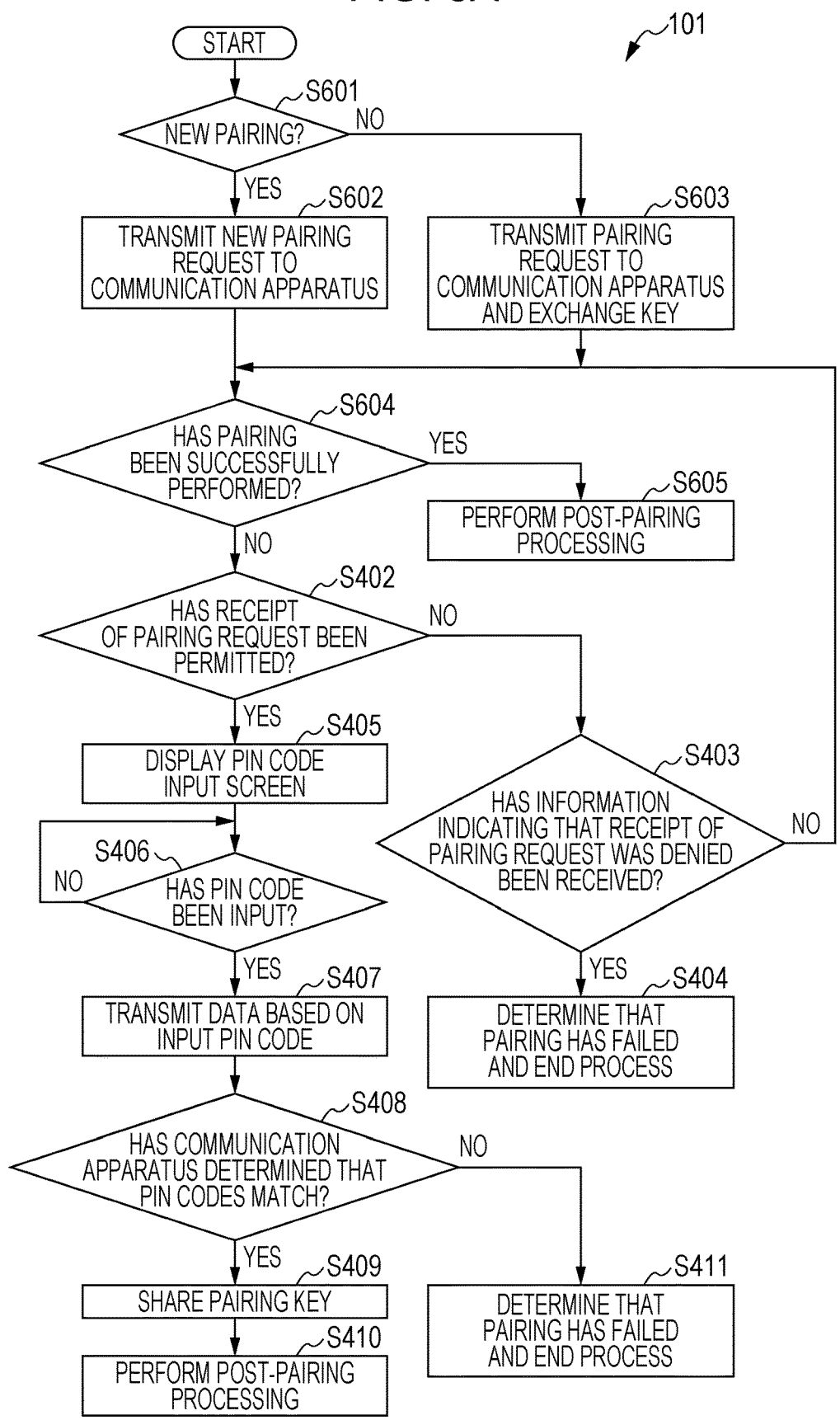

A process of varying pairing processing based on a result of the determination of whether new pairing is to be performed will be described with reference to FIGS. 5A and 5B. FIGS. 5A and 5B are flowcharts illustrating an exemplary pairing process according to this embodiment. There is illustrated a paring process performed by the communication apparatus 151 and the information processing apparatus 101 via the short-range wireless communication units 110 and 157. The information processing apparatus 101 performs a process illustrated in FIG. 5A, and the communication apparatus 151 performs a process illustrated in FIG. 5B. Specifically, like the process illustrated in FIGS. 3A and 3B, the process performed by the communication apparatus 151 is realized by causing the CPU 154 to execute various programs stored in the ROM 152 in the RAM 153 and the process illustrated performed by the information processing apparatus 101 is realized by causing the CPU 103 to execute various programs stored in the ROM 104 in the RAM 105. The process performed by the communication apparatus 151 may be realized by causing the CPU 201 included in the short-range wireless communication, unit 157 to execute various programs stored in the ROM 203 in the RAM 204. Alternatively, the process illustrated in FIGS. 5A and 5B may be realized by causing the CPUs 103 and 201 to cooperate with each other. Various types of communication between the information processing apparatus 101 and the communication apparatus 151 illustrated in FIGS. 5A and 5B are performed by the short-range wireless communication units 110 and 157.

The information processing apparatus 101 performs Bluetooth® Low Energy connection when a user has input an instruction for performing Bluetooth® Low Energy communication and the information processing apparatus 101 has received an advertisement signal from the communication apparatus 151. Subsequently, the process illustrated in FIG. 5A, starts. The communication, apparatus 151 performs Bluetooth® Low Energy connection while or after transmitting an advertisement signal and starts the process illustrated in FIG. 5B. In a case where the pairing between the information processing apparatus 101 and the communication apparatus 151 has already been performed, a pairing key and paring key recognition information are stored in the ROM's 104 and 152.

In S601, the information processing apparatus 101 determines whether the pairing between it and the communication, apparatus 151 has already been performed, or the pairing between them is to be newly performed. As a determination method performed in S601, a method of determining that new pairing is to be performed when no pairing key is saved in the ROM 104 may be employed in a case where only one pairing key is saved, it is determined that the pairing between it and the communication apparatus 151 has already been performed even though the saved pang key is not shared, for the paring with the communication apparatus 151.

As another determination method performed in S601, in a case where information for example, a MAC address) for specifying the communication apparatus 151 is included in an advertisement signal transmitted from the communication apparatus 151, a method using the information may be employed. Specifically, when the information processing apparatus 101 performs Bluetooth® Low Energy pairing with an external apparatus, the information processing apparatus 101 associates a MAC address included in an advertisement signal with a pairing key saved for the pairing and saves them in the ROM 104. Upon receiving a new advertisement signal from the communication apparatus 151, the information processing apparatus 101 determines whether a MAC address included in the advertisement signal is saved in the ROM 104 in S601. In a case where the MAC address is saved, it is determined that the pairing with the communication apparatus 151 has already been performed. In a case where the MAC address is not saved, it is determined that new pairing with, the communication, apparatus 151 is to be performed. As information for specifying the communication apparatus 151, various pieces of information such as a terminal name and a specific value can be employed.

In a case where it is determined in S601 that new pairing with the communication apparatus 151 is to be performed, the information processing apparatus 101 transmits a request for new pairing to the communication apparatus 151 in S602. In a case where it is determined in S601 that the pairing with the communication apparatus 151 has already been performed, the information processing apparatus 101 performs the processing of S603. In S603, the information processing apparatus 101 transmits a pairing request to the communication apparatus 151 and exchanges a key with the communication apparatus 151. At that time, in reality, key information itself is not transmitted from the information processing apparatus 101 to the communication apparatus 151. The information processing apparatus 101 transmits key recognition information saved in the ROM 104 to the communication apparatus 151.

In S501, the communication apparatus 151 determines whether a pairing request has been transmitted from an external terminal. In a case where it is determined in S501 that there is a pairing request, the communication apparatus 151 determines whether the pairing request is a request for new pairing in S502. In a case where the information processing apparatus 101 makes a pairing request in S602, the communication apparatus 151 determines in S502 that the pairing request is a request for new pairing and performs the processing of S302. In a case where the information processing apparatus 101 makes a pairing request in S603, the communication apparatus 151 determines in S502 that the pairing request is not a request for new pairing and the pairing has already been performed, and, performs the processing of S503.

The pairing requests are transmitted in S602 and S603 such that the communication apparatus 151 can distinguish between them in S502. For example, in S603, the information processing apparatus 101 reads pairing key recognition information from the ROM 104 and transmits a pairing request to the communication apparatus 151 along with the pairing key recognition information. In S602, the information processing apparatus 101 transmits a pairing request without transmitting pairing key recognition information. In S502, the communication apparatus 151 may determine whether the paring request is a request for new pairing based on the fact whether the pairing key recognition information has been transmitted thereto.

The information processing apparatus 101 and the communication apparatus 151 determine in S603 and S503 whether the pairing key saved in the ROM 101 and the pairing key saved in the ROM 152 match, respectively. In S603 and S503, pairing keys may be exchanged. Alternatively, the determination of whether pairing keys match may be performed using pairing key recognition information. Specifically, in S603, the information processing apparatus 101 transmits pairing key recognition information to the short-range wireless communication unit 157 via the short-range wireless communication unit 110. In S503, the communication apparatus 151 retrieves in the ROM 152 the pairing key that the information processing apparatus 101 has using the pairing key recognition information transmitted from the information processing apparatus 101. In a case where the pairing key is retrieved, the communication apparatus 151 encrypts the retrieved pairing key using the retrieved pairing key and transmits the encrypted pairing key to the information processing apparatus 101. In a case where the information processing apparatus 101 successfully performs decryption using a key saved in the ROM 104 and the decrypted key matches the key saved in the ROM 104, it is determined that the pairing keys which the information processing apparatus 101 and the communication apparatus 151 have match.

In S604 and S504, the information processing apparatus 101 and the communication apparatus 151 determine whether pairing has been successfully performed after the pieces of processing of S603 and S503, respectively. For example, in a case where it is determined that a pairing key which the communication apparatus 151 has and a pairing key which the information processing apparatus 101 has match, the information processing apparatus 101 determines in S604 that pairing has been successfully performed. The information processing apparatus 101 notifies the communication apparatus 151 via the short-range wireless communication unit 110 that pairing has been successfully performed. Upon receiving the notification, the communication apparatus 151 determines in S504 that pairing has been successfully performed. On the other hand, there is the case where it is determined that the above-described two pairing keys do not match after the pieces of processing of S603 and S503 or the case where no pairing key is saved in the ROM 152 included in the communication apparatus 151 and pairing key matching confirmation could not be performed in S503. In this case, in S504, the communication apparatus 151 determines that pairing key matching confirmation have failed and notifies the information processing apparatus 101 that the pairing has failed. Upon receiving the notification, the information processing apparatus 101 determines in S604 that the pairing has not been successfully performed. Since the success of pairing does not occur at the time of making a request for new pairing in S602, the information processing apparatus 101 may skip the processing of S604 after the processing of S602 and perform the processing of S402.

In a case where it is determined in S604 and S504 that the pairing has been successfully performed, the information processing apparatus 101 and the communication apparatus 151 perform predetermined post-pairing processing in S605 and S505, respectively. For example, the short-range wireless communication units 110 and 157 perform GATT communication in Bluetooth® Low Energy.

In a case where it is not determined in S504 that the pairing has been successfully performed, the communication apparatus 151 may perform the processing of S302 like after it has determined in S502 that a new paring request was received. Alternatively, in a case where it is not determined in S504 that the pairing has been successfully performed, the communication apparatus 151 may transmit information indicating that the receipt of the pairing request is denied like S310. Subsequently, the communication apparatus 151 may determine that pairing has failed, disconnect the Bluetooth® Low Energy connection, and end the process like S311.

The process subsequent to S302 is the same as the process illustrated in FIG. 3B, and the description thereof will be therefore omitted. In a case where it is not determined in S604 that the pairing has been successfully performed, the information processing apparatus 101 may perform the processing of S402. Alternatively, the information processing apparatus 101 may disconnect the Bluetooth® Low Energy connection and end the process like S404. The process subsequent to S402 is the same as the process illustrated in FIG. 3A, and the description thereof will be therefore omitted. The process subsequent to S302 may be automatically performed after the processing of S504 illustrated in FIG. 5B, and the process subsequent to S402 may be automatically performed after the processing of S604 illustrated in FIG. 5A. In this case, even if a user does not make a request for new pairing after the pairing between the information processing apparatus 101 and the communication apparatus 151 has failed, new pairing can be performed by, for example, the input of a PIN code.

In a case where it is determined in S502 that the paring request is a request for new pairing, the communication apparatus 151 performs pairing on condition that it is in a PIN code displayable state in S302. On the other hand, in a case where it is determined in S502 that the paring request is a re-pairing request transmitted from the information processing apparatus 101 with which the communication apparatus 151 has already performed pairing, the communication apparatus 151 performs the processing of S503 regardless of whether it is in a PIN code displayable state. For example, even in a case where the communication apparatus 151 is in the software-off state and the display unit 160 is in the state illustrated in FIG. 43, the communication apparatus 151 performs the processing of S503. An the case of re-pairing, authentication for which a PIN code is used is not performed. Pairing processing is performed using the key shared by the information processing apparatus 101 and the communication apparatus 151 at the time of the previous pairing. Therefore, the communication apparatus 151 does not need to display a PIN code on the display unit 160. Accordingly, in the case of re-pairing, authentication processing (key matching confirmation) is performed in S503 regardless of whether the communication apparatus 151 is in the PIN code displayable state as described above. This can prevent a situation in which all pairing requests are denied when the communication apparatus 151 is in a PIN code undisplayable state (for example, the software-off state) and re-pairing, for which the display of a PIN code is not needed, is not performed.

In the processes illustrated in FIGS. 3A, 3B, 5A, and 5B, the short-range wireless communication unit 157 can perform, communication even if the communication apparatus 151 is in the software-off state. Thus, for the communication apparatus 151, a user may set whether to activate the short-range wireless communication unit 157 in the software-off state in advance.

After the communication apparatus 151 has displayed the PIN code screen illustrated in FIG. 4A on the display unit 160 in S304 in FIGS. 3B and 5B, the display of the display unit 160 is sometimes turned off before a PIN code is input in S305. For example, in a case where a user brings the communication apparatus 151 into the software-off state by, for example, pressing a power button after the display processing of S304, the display of a PIN code is turned off and the state illustrated in FIG. 4B occurs. Alternatively, the communication apparatus 151 is sometimes set such that the communication apparatus 151 is automatically brought into the software-off state when a user's operation or the receipt of data is not performed for a predetermined period of time. In this case, when the communication apparatus 151 is in an idle state for the predetermined period of time after the display of a PIN code in S304, the display of the PIN code is turned off and the state illustrated in FIG. 4B occurs.

However, the communication apparatus 151 performs the process subsequent to 3306 regardless of whether the communication apparatus 151 is in the software-on state or the software-off state when a PIN code is input in S305 in FIGS. 3B and 5B. For example, it can be considered that the communication apparatus 151 is manually (by the press of a power button) or automatically brought into the software-off state after a user has visually recognized and memorized a PIN code on the communication apparatus 151. Also in this case, the user can input the memorized PIN code into the information processing apparatus 101. The communication apparatus 151 therefore performs the process subsequent to S306 even if the communication apparatus 151 is in the software-off state when the PIN code is input in S305.

In the pieces of processing of S302, S303, and S310 in FIGS. 33 and 5B, the communication apparatus 151 notifies, by Bluetooth®, Low Energy communication, the information processing apparatus 101 of a result of determination whether to accept a pairing request based on a result of determination whether the communication apparatus 151 is in a PIN code input state. However, the communication apparatus 151 may notify the information processing apparatus 101 of a result of determination whether the communication apparatus 151 is in a PIN code input state by Bluetooth® Low Energy communication in S302. In this case, the information processing apparatus 101 determines whether to display a PIN code input screen based on the notification. In a case where the information processing apparatus 101 does not display a PIN code input screen, the information processing apparatus 101 determines that the pairing has failed and ends the process. The information processing apparatus 101 may notify the communication apparatus 151 that the pairing has failed by Bluetooth® Low Energy communication. The communication apparatus 151 may determine that the pairing has failed and end the process.

In the above-described embodiment, an exemplary PIN code display method, of causing the communication, apparatus 151 to present a PIN code for a user has been described. However, the print engine 155 may print, a PIN code in S304 in FIGS. 3B and 5B to present the PIN code for a user.

While exemplary embodiments have been described, it is to be understood that the disclosure is not limited to the disclosed, exemplary embodiments. The scope of the following claims is to be accorded the broadest interpretation so as to encompass all such modifications and equivalent structures and functions.

This application claims the benefit of Japanese Patent Application. No. 2017-128955 filed Jun. 30, 2017, which is hereby incorporated by reference herein in its entirety.

What is claimed is:

1. A communication method of causing a communication apparatus and an information processing apparatus to perform pairing for predetermined wireless communication, the communication method comprising:
   causing the information processing apparatus to make a predetermined request to the communication apparatus;
   causing the communication apparatus to display first authentication information for the pairing upon receiving the predetermined request;

causing the information processing apparatus to display an input screen on which a user inputs second authentication information for the pairing; and causing, in a case where the second authentication information has been input on the input screen, the information processing apparatus and the communication apparatus to perform the pairing based on the first authentication information and the second authentication information, wherein the information processing apparatus does not display the input screen in a case where the communication apparatus that received the predetermined request is in a first state where the first authentication information is not displayed, and wherein the information processing apparatus displays the input screen in a case where the communication apparatus that received the predetermined request is in a second state where the first authentication information is displayed.

2. The communication method according to claim 1, further comprising causing the communication apparatus to provide the information processing apparatus different pieces of information depending on whether the communication apparatus is in the first or second state, and wherein, based on the provided information, the information processing apparatus does not display the input screen in a case where the communication apparatus is in the first state and displays the input screen in a case where the communication apparatus is in the second state.

3. The communication method according to claim 1, further comprising causing the information processing apparatus and the communication apparatus to store predetermined information in a case where a user has input the second authentication information matching the first authentication information and the pairing has been performed, and wherein, in a case where the information processing apparatus storing the predetermined information has made the predetermined request to the communication apparatus storing the predetermined information, the information processing apparatus and the communication apparatus perform the predetermined wireless communication regardless of establishment of the pairing.

4. The communication method according to claim 3, wherein, in a case where the information processing apparatus that does not store the predetermined information has made the predetermined request to the communication apparatus, the pairing is performed on condition that the communication apparatus is in the second state, and wherein, in a case where the information processing apparatus storing the predetermined information has made the predetermined request to the communication apparatus storing the predetermined information, the pairing is performed regardless of whether the communication apparatus is in the first or second state.

5. The communication method according to claim 1, wherein a state of the communication apparatus is changed from the first state to the second state by a user's operation performed on the communication apparatus.

6. The communication method according to claim 1, wherein the first and second states are states regarding a power supply for the communication apparatus.

7. The communication method according to claim 1, wherein the information processing apparatus and the communication apparatus perform wireless communication in accordance with Bluetooth® Low Energy.

8. The communication method according to claim 1, wherein the predetermined wireless communication is GATT communication in Bluetooth® Low Energy.

9. The communication method according to claim 1, wherein the communication apparatus is a printer for printing an image.

10. A communication method of causing a communication apparatus and an information processing apparatus to perform pairing for predetermined wireless communication, the communication method comprising:

causing the information processing apparatus to make a predetermined request to the communication apparatus;

causing the communication apparatus to present first authentication information for the pairing upon receiving the predetermined request;

causing, in a case where second authentication information has been input into the information processing apparatus, the information processing apparatus and the communication apparatus to perform the pairing based on the first authentication information and the second authentication information;

causing, in a case where a user has input the second authentication information matching the first authentication information into the information processing apparatus and the pairing has been performed, the information processing apparatus and the communication apparatus to store predetermined information; and causing the information processing apparatus and the communication apparatus to perform the predetermined wireless communication based on the predetermined information, wherein the pairing is performed in a case where the communication apparatus that received the predetermined request from the information processing apparatus that does not store the predetermined information is in a first state where the first authentication information is presented, wherein the pairing is not performed in a case where the communication apparatus that received the predetermined request from the information processing apparatus that does not store the predetermined information is in a second state where the first authentication information is not presented, and wherein the predetermined wireless communication is performed regardless of whether the communication apparatus is in the first or second state in a case where the communication apparatus storing the predetermined information received the predetermined request from the information processing apparatus storing the predetermined information.

11. A communication apparatus that performs pairing with an information processing apparatus for predetermined wireless communication, the communication apparatus comprising:

a display unit configured to, upon receiving a predetermined request from the information processing apparatus, display first authentication information for predetermined communication with the information processing apparatus;

a notification unit configured to provide different notifications to the information processing apparatus based on a state of the communication apparatus; and a pairing unit configured to perform the pairing based on the first authentication information and second authentication information, where the second information is input via an input screen displayed on the information processing apparatus that is based on a notification provided by the notification unit, wherein the notification unit provides a notification not to cause the information processing apparatus to display the input screen in a case where the communication apparatus in a first state where the first authentication information is not displayed on the display unit, and wherein the notification unit provides a notification to cause the information processing apparatus to display the input screen in a case where the communication apparatus is in a second state where the first authentication information is displayed on the display unit.

12. The communication apparatus according to claim 11, wherein the notification unit is further configured to provide the information processing apparatus different pieces of information depending on whether the communication apparatus is in the first or second state, and wherein, based on the provided information, the information processing apparatus does not display the input screen in a case where the communication apparatus is in the first state and displays the input screen in a case where the communication apparatus is in the second state.

13. The communication apparatus according to claim 11, further comprising a storing unit configured to store predetermined information in a case where a user inputs the second authentication information matching the first authentication information and the pairing has been performed, and wherein, in a case where the communication apparatus receives the predetermined request from an information processing apparatus storing the predetermined information, the information processing apparatus and the communication apparatus perform the predetermined wireless communication regardless of establishment of the pang.

14. The communication apparatus according to claim 13, wherein, in a case where the communication apparatus receives the predetermined request from an information processing apparatus that does not store the predetermined information, the pairing is performed on condition that the communication apparatus is in the second state, and wherein, in a case where the communication apparatus receives the predetermined request from an information processing apparatus storing the predetermined information, the pairing is performed regardless of whether the communication apparatus is in the first or second state.

15. The communication apparatus according to claim 11, wherein a state of the communication apparatus is changed from the first state to the second state by a user's operation performed on the communication apparatus.

16. The communication apparatus according to claim 11, wherein the first and second states are states regarding a power supply for the communication apparatus.

17. The communication apparatus according to claim 11, wherein the communication apparatus performs wireless communication with the information processing apparatus in accordance with Bluetooth® Low Energy.

18. The communication apparatus according to claim 11, wherein the predetermined wireless communication is GATT communication in Bluetooth® Low Energy.

19. The communication apparatus according to claim 11, wherein the communication apparatus is a printer for printing an image on a print medium.

20. A communication apparatus that performs pairing with an information processing apparatus for predetermined wireless communication, the communication apparatus comprising:

a presenting unit configured to present first authentication information for the pairing upon receiving a predetermined request from the information processing apparatus;

a performing unit configured to perform the pairing based on the first authentication information and second authentication information provided by the information processing apparatus;

a storing unit configured to store, in a case where the pairing has been performed, predetermined information; and a communication unit configured to perform the predetermined wireless communication based on the stored predetermined information, wherein the pairing is performed in a case where the communication apparatus in a first state where the first authentication information is presented when the communication apparatus receives the predetermined request but not information corresponding to the stored predetermined information from the information processing apparatus, wherein the pairing is not performed in a case where the communication apparatus is in a second state where the first authentication information is not presented when the communication apparatus receives the predetermined request but not information corresponding to the predetermined information from the information processing apparatus, and wherein the predetermined wireless communication is performed regardless of whether the communication apparatus is in the first or second state in a case where the communication apparatus receives the predetermined request and information corresponding to the predetermined information from the information processing apparatus.

* * * * *